US010147126B2

(12) United States Patent
Goldstein et al.

(10) Patent No.: US 10,147,126 B2
(45) Date of Patent: Dec. 4, 2018

(54) MACHINE TO GENERATE A SELF-UPDATING MESSAGE

(71) Applicant: Hipmunk, Inc., San Francisco, CA (US)

(72) Inventors: Adam Julian Goldstein, San Francisco, CA (US); Steven Ladd Huffman, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 804 days.

(21) Appl. No.: 14/499,531

(22) Filed: Sep. 29, 2014

(65) Prior Publication Data

US 2016/0092958 A1 Mar. 31, 2016

(51) Int. Cl.
G06Q 30/00 (2012.01)
G06Q 30/06 (2012.01)
G06Q 20/20 (2012.01)

(52) U.S. Cl.
CPC ....... *G06Q 30/0625* (2013.01); *G06Q 20/201* (2013.01)

(58) Field of Classification Search
CPC .................................................. G06Q 30/00
See application file for complete search history.

(56) References Cited

U.S. PATENT DOCUMENTS

| 8,326,930 | B2 * | 12/2012 | Patrick | G06Q 10/107 709/204 |
| 8,676,663 | B1 * | 3/2014 | Robinson | G06Q 30/0259 705/14.1 |
| 2004/0122808 | A1 * | 6/2004 | Martin | G06F 17/30899 |
| 2006/0064333 | A1 * | 3/2006 | Razza | G06Q 10/02 705/5 |
| 2011/0032563 | A1 * | 2/2011 | Matsuzawa | H04N 1/00222 358/1.15 |
| 2011/0099074 | A1 * | 4/2011 | Oak | G06Q 30/02 705/14.66 |
| 2013/0246404 | A1 * | 9/2013 | Annau | G06F 17/30672 707/723 |

(Continued)

OTHER PUBLICATIONS

Hall, Wendy. "Ending the Tyranny of the Button." IEEE multimedia 1.1 (1994): 60-68. (Year: 1994).*

*Primary Examiner* — Marissa Thein
*Assistant Examiner* — Michelle T Kringen
(74) *Attorney, Agent, or Firm* — Schwegman Lundberg & Woessner, P.A.

(57) ABSTRACT

A machine may generate and provide a message that updates itself when opened. Such a message may include a link that, when operated during display of the message by a user's device, causes the machine to generate an image that depicts updated information in the form of one or more updated parameters. For example, the machine may operate within a travel search engine and may generate and provide a message that includes a previously found search result and also includes a link to an image that, once generated, depicts an updated parameter for the search result. As part of displaying the message, the user's device may operate the link, which causes the machine to generate the image and provide the image to the device. The device receives the image and displays the message, which includes the search result and now also includes the image of the updated parameter.

21 Claims, 13 Drawing Sheets

(56) References Cited

U.S. PATENT DOCUMENTS

2013/0290234 A1* 10/2013 Harris ................... G06N 5/022
                                                            706/46
2015/0156154 A1*  6/2015 Russell .................. H04L 51/18
                                                           709/206

* cited by examiner

MACHINE TO GENERATE A SELF-UPDATING MESSAGE

TECHNICAL FIELD

The subject matter disclosed herein generally relates to machines that are configured to generate useful information. Specifically, the present disclosure addresses systems and methods to facilitate machine-generation of messages.

BACKGROUND

A machine may form all or part of a network-based search engine, and such a machine may be configured to provide a search service with respect to a database (e.g., a search engine for the database). For example, the machine may receive a query and respond to the query by providing one or more search results identified and retrieved from the database. The query may be submitted by a user from a device, and the machine may receive the query from the device of the user. Accordingly, the machine may provide the one or more search results to the user in response to the submitted query.

BRIEF DESCRIPTION OF THE DRAWINGS

Some embodiments are illustrated by way of example and not limitation in the figures of the accompanying drawings.

DETAILED DESCRIPTION

Figure 1:
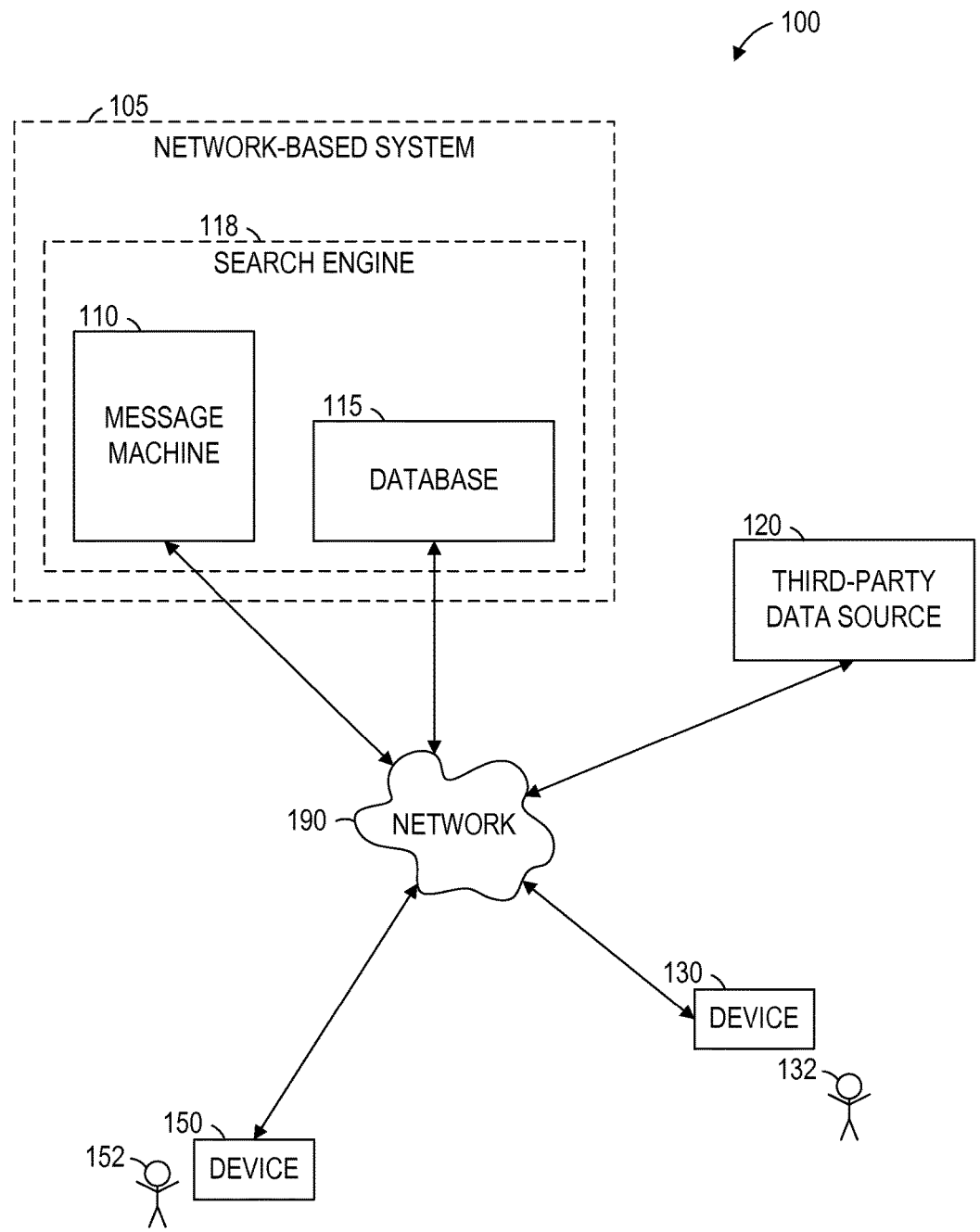
FIG. 1 is a network diagram illustrating a network environment suitable for operating a message machine to generate and provide a message, according to some example embodiments.

Example methods and systems are directed to a machine to generate a self-updating message (e.g., a message that updates itself when presented). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A message machine may be configured to generate and provide a message that references a search result that had been previously provided to a user of a search engine. For example, the message machine may form all or part of a travel search engine, and in response to a query submitted by a user, the travel search engine may provide the user with a search result that references a particular airline flight. Thereafter, the message machine may send the user a message (e.g., an alert) that references the same airline flight. This may be performed by the message machine automatically (e.g., in response to a change in availability or price of the flight) or in accordance with a preference of the user for receiving alerts (e.g., fare alerts) regarding previously obtained search results. However, some information (e.g., one or more parameters, such as availability or price) regarding the airline flight may change between the time that the message is sent and the time that the user opens the message for reading. Thus, at the time the message is read, the message may be conveying obsolete or otherwise expired information.

Accordingly, a message machine may be configured (e.g., by software being executed be one or more processors of the message machine) to generate and provide an updatable message that appears to update itself when opened for viewing. A message that, when presented, updates itself or triggers operations that result in the appearance of updating itself may be considered as a "self-updating" message.

In particular, a self-updating message may be generated to include at least some of the previously provided search result and also include a link that, when operated during display of the message by a device of the user, causes the message machine to generate and provide an image that depicts the updated information (e.g., one or more updated parameters) that corresponds to the search result referenced by the message. Continuing the previous example, the message machine within the travel search engine may generate and provide a message that includes a link to an image that is yet to be generated, but that, once generated, will depict some updated information for the airline flight referenced by the previously provided search result. Thus, the link is generated (e.g., by the message machine) before its corresponding image is generated (e.g., by the message machine). Moreover, the link may contain data that is sufficient to identify the user, identify the previously provided search result (e.g., the airline flight), identify one or more search criteria used to obtain the previously provided search result, or any suitable combination thereof.

No matter when this message is provided to the user, in opening the message, the user's device may operate the included link (e.g., as part of displaying the message), which may cause the message machine to then generate and provide the image referenced by the link. The device receives the image and displays the previously received message, which includes some or all of the search result (e.g., the airline flight), and now also includes the image that depicts the updated information. In some example embodiments, the image is a static image of the updated information, while in alternative example embodiments, the image is an animated image (e.g., a sequence of ordered images, such as a video clip).

For clarity, much of the discussion herein focuses on a travel search engine with a message machine that generates and provides a self-updating message that, along with one or more details of a previously searched airline flight, includes a link to an image that, once generated, illustrates (e.g., shows, depicts, or otherwise indicates) an updated price for the same previously searched airline flight, which previously did not have that updated price. However, the airline flight is an example of a search result, and the price of the airline flight is the example of a parameter that corresponds to (e.g., describes) that search result. Accordingly, the methodologies described herein are similarly applicable to other kinds of search results and their associated (e.g., corresponding) parameters.

For example, in the case of a travel search engine, the search result may be or include a travel option other than an airline flight, such as, a car rental, a train ticket, a bus ticket, a ferry ticket, a hotel stay, or trip insurance. As another example, a message machine in a hotel search engine may generate a message that includes a link to an image that, when generated, depicts an updated availability (e.g., a sequence of one or more available calendar dates, or a particular type or size of hotel room) for a previously searched hotel stay that previously did not have that updated availability. As another example, a message machine in a shopping search engine may generate a message that includes a link to an image that, after generation, depicts an updated price for a previously searched product (e.g., a car, a camera, a dress, or a pair of shoes) that is available for purchase but previously did not have that updated price. In the case of a shopping search engine, the search result may include a purchase option that includes a purchasable item, a purchasable service, a reservation to purchase an item, a reservation to purchase a service, downloadable data (e.g., a digital download, such as, a media file), an authorization to access or use any of these, or any suitable combination of these. As a further example, a message machine in a news search engine may generate a message that includes a link to an image that, after being generated, shows an updated sub-headline for a previously searched news headline that did not have that sub-headline.

FIG. 1 is a network diagram illustrating a network environment 100 suitable for operating a message machine 110, according to some example embodiments. The network environment 100 includes the message machine 110, a database 115, a third-party data source 120, and devices 130 and 150, all communicatively coupled to each other via a network 190. The message machine 110, with or without the database 115, may form all or part of a search engine 118 (e.g., a travel search engine, a hotel search engine, a shopping search engine, a news search engine, or any suitable combination thereof). In addition, the search engine 118 may form all or part of a network-based system 105 (e.g., a cloud-based server system configured to provide one or more services, such as search engine services, to the devices 130 and 150). The third-party data source 120 may be or include a database (e.g., similar to database 115). In some example embodiments, the third-party data source 120 is a web server machine operated by a third-party (e.g., a business entity distinct from the business entity that operates the message machine 110). The message machine 110, the database 115, the third-party data source 120, and the devices 130 and 150 may each be implemented in a computer system, in whole or in part, as described below with respect to FIG. 13.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the message machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
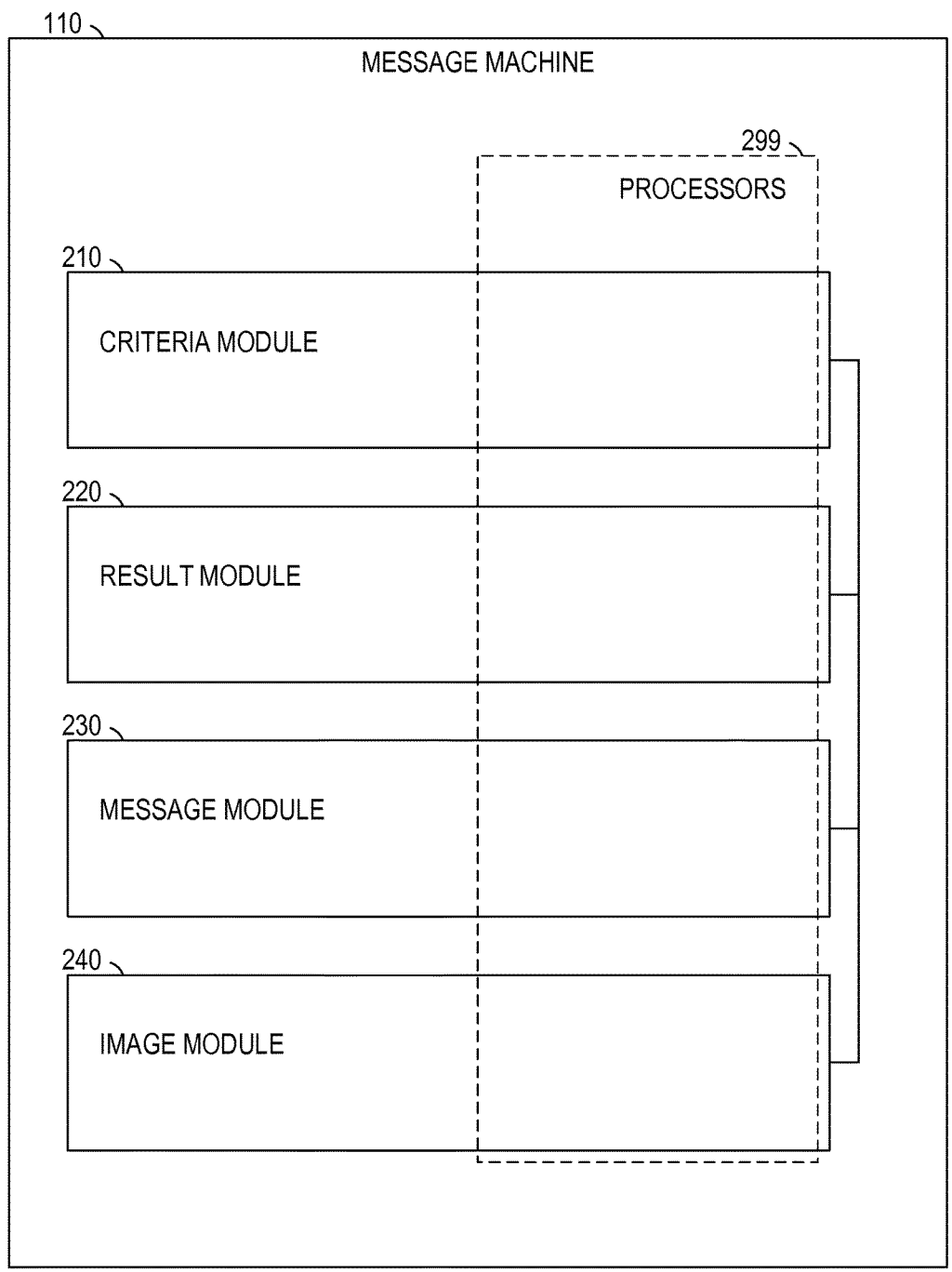
FIG. 2 is a block diagram illustrating components of a message machine, according to some example embodiments.

FIG. 2 is a block diagram illustrating components of the message machine 110, according to some example embodiments. The message machine 110 is shown as including a criteria module 210, a result module 220, a message module 230, and an image module 240, all configured to communicate with each other (e.g., via a bus, shared memory, or a switch). Functions of these modules are discussed below with respect to FIGS. 5-10.

Any one or more of the modules described herein may be implemented using hardware alone (e.g., one or more processors 229 of the message machine 110) or a combination of hardware and software. For example, any module described herein may physically include an arrangement of one or more processors (e.g., among the one or more processors 229 of the message machine 110) configured to perform the operations described herein for that module. As another example, any module described herein may include software, hardware, or both, that configure an arrangement of one or more processors (e.g., among the one or more processors 229 of the message machine 110) to perform the operations described herein for that module. Accordingly, different modules described herein may include and configure different arrangements of such processors or a single arrangement of such processors at different points in time. Moreover, any two or more modules described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
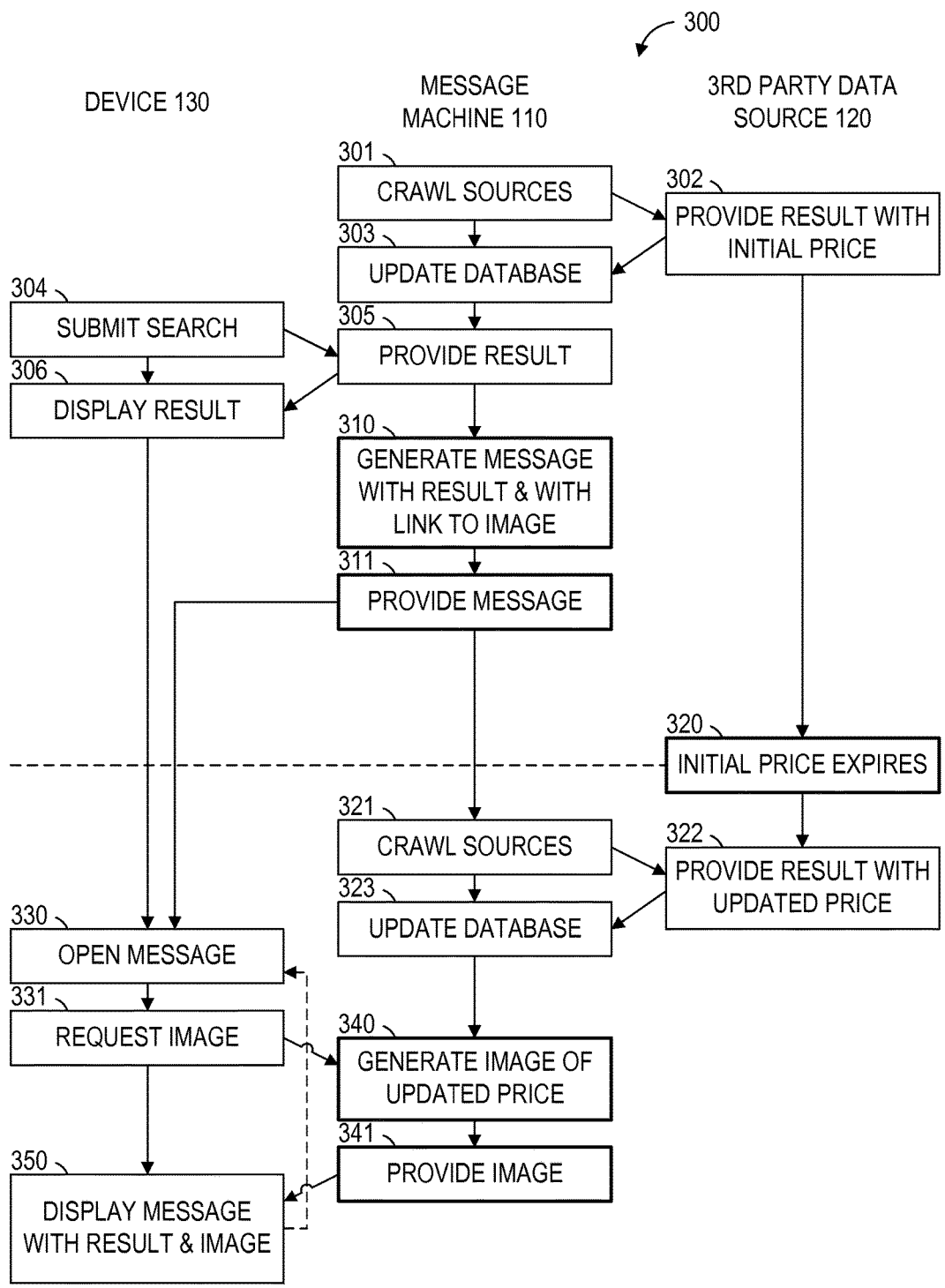
FIGS. 3 and 4 are flowcharts illustrating operations and data flows within the network environment, according to various example embodiments.
Figure 4:
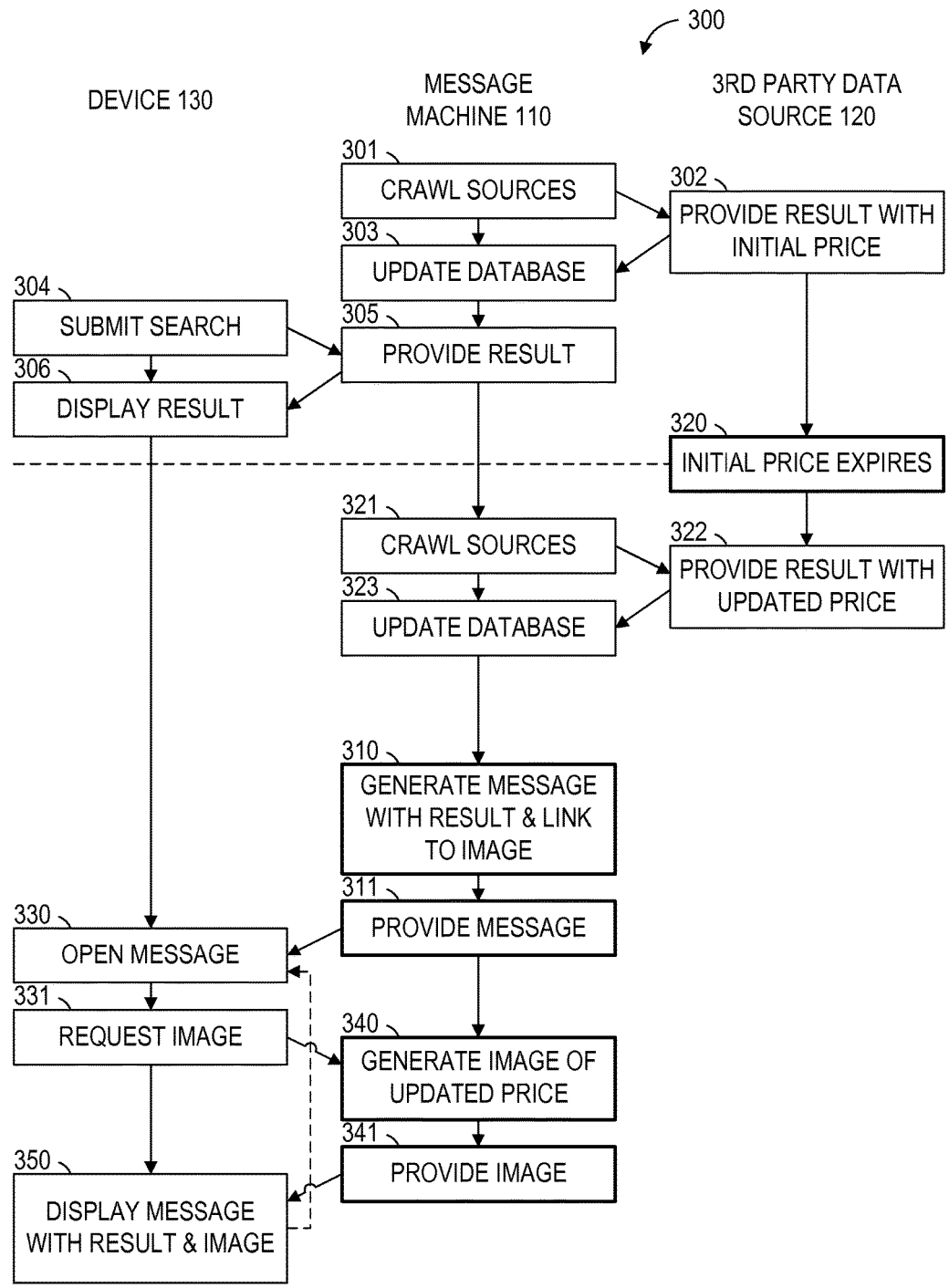

FIGS. 3 and 4 are flowcharts illustrating operations and data flows within the network environment 100, according to various example embodiments. These operations and data flows define a method 300 that may be performed by the device 130, the message machine 110, and the third-party data source 120. As shown in FIGS. 3 and 4, a portion of the method 300 includes operations performed by the device 130, and such portion may define a method of operating the device 130. Similarly, a portion of the method 300 includes operations performed by the message machine 110, and such portion may define a method of operating the message machine 110. Likewise, a portion of the method 300 includes operations performed by the third-party data source 120, and such portion may define a method of operating the third-party data source 120. Operations 301-350 will now be described with reference to FIG. 3.

In operation 301, the message machine 110 accesses (e.g., crawls) one or more third-party data sources (e.g., third-party data source 120) via one or more networks (e.g., network 190) to access these third-party data sources. As shown, the message machine 110 crawls various data sources and accordingly accesses the third-party data source 120 to obtain information for aggregation into the database 115 of the message machine 110. In particular, the message machine 110 may send the third-party data source 120 a request for information to be aggregated and stored in the database 115 and then later provided to the device 130 as a search result with one or more corresponding parameters.

In operation 302, the third-party data source 120 responds to the message machine 110 by providing the requested information. In some example embodiments, the provided information may be or include a search result (e.g., an airline flight) and its corresponding price at that point in time. This corresponding price for the search result may be considered as an initial price or a first price of the search result.

In operation 303, the message machine 110 updates its database 115 with the received information (e.g., the airline flight and its initial price). This may have the effect of configuring or otherwise enabling the database 115 to be subsequently searched to retrieve the search result (e.g., the airline flight) and its initial price (e.g., first price).

In operation 304, as operated by the user 132, the device 130 submits a search (e.g., a query) to the message machine 110 via the network 190. The search may include one or more search criteria, and such search criteria may be submitted by the user 132. In the situation illustrated, the search result (e.g., the airline flight) discussed above with respect to operation 303 is an appropriate response to the search criteria (e.g., as determined by the message machine 110).

In operation 305, the message machine 110 responds to the device 130 by providing the search result (e.g., the airline flight) to the device 130. The search result may be provided with its initial price. In operation 306, the device 130 presents (e.g., displays) the search result. In some example embodiments, the search result may be displayed with its initial price, as received from the message machine 110. Although FIGS. 3 and 4 illustrate example scenarios in which the message machine 110 keeps its database 115 updated and provides the search result from the updated database 115, in other example scenarios, operation 304 triggers performance of operations 301-303, and the message machine 110 updates its database 115 in response to reception of the search submitted in operation 304.

In operation 310, the message machine 110 generates a message (e.g., an updatable message) that includes some or all of the search result. The message also includes a link (e.g., a uniform resource locator (e.g., URL) or other pointer) that is generated by the message machine 110. In particular, the generated link refers to an image that, at the time that the link is generated, is yet to be generated. However, when the image is later generated, the image will depict the then-current price of the search result (e.g., the airline flight). That is, at the time that the image is generated, an updated price of the airline flight is depicted in the image. In operation 311, the message machine 110 provides the generated message, with the generated link, to the device 130. In some example embodiments, the generated message may indicate (e.g., in its text) that it is a self-updating message.

One or both of operations 310 and 311 may be performed automatically by the message machine 110 in response to one or more triggers (e.g., trigger events or received indications thereof). Examples of such triggers include detection of change in the price of the airline flight (e.g., an increase or decrease in fare), passage of a predetermined length of time (e.g., one month) since the user 132 searched for the airline flight, a preference of the user 132 for receiving messages (e.g., alerts) regarding the airline flight, a profile of the user 132 indicating ongoing interest in this or similar airline flights, a geolocation of the device 130 (e.g., the current geolocation of the device 130, or a previous geolocation of the device 130, as detected by geolocation hardware in the device 130), a geolocation of the user 132 (e.g., the current geolocation of the user, or a previous geolocation of the user, as reported by the user 132 to one or more social media services or social networking services), a submission by the user 132 to one or more social media websites or social networking websites, or any suitable combination thereof.

Subsequently, at operation 320, the initial price of the search result (e.g., the airline flight) expires at the third-party data source 120. For example, the initial price may be replaced with an updated price that is higher or lower than the initial price. In certain example embodiments, the third party that operates the third-party data source 120 is also offering for sale a product or service referenced by the search result (e.g., the airline flight). Hence, the initial and updated prices may be set by that third-party, and the initial and updated prices may signify that the cost to the user 132 for obtaining (e.g., purchasing, reserving, or otherwise procuring) the search result has changed as of operation 320.

Operations 321, 322, and 323 are similar to operations 301, 302, and 303, and may be performed as previously described with respect to operations 301, 302, and 303 (e.g., in a periodic, repetitive, or routine manner, or in response to communication from the third-party data source 120 indicating that information stored there has been updated). Accordingly, in operation 321, the message machine 110 crawls the network 190 (e.g., again) to access the third-party data source 120. In operation 322, the third-party data source 120 responds by providing the same search result (e.g., the same airline flight) that was previously provided in operation 302, but now that same search result is being provided with its updated price, which may be accompanied with one or more other updated parameters (e.g., availability) of the search result. In operation 323, the message machine 110 updates the database 115 with the updated price of the search result (e.g., the airline flight) and possibly with one or more other updated parameters (e.g., availability) of the search result.

In operation 330, though the device 130 has not yet received the updated price of the search result (e.g., airline flight), and the user 132 may be unaware that the initial price of the search result has expired, the device 130 opens the message (e.g., the self-updating message) that was provided in operation 311. This may be performed in response to a request by the user 132 to view the message. In operation 331, as part of opening or presenting (e.g., displaying or rendering) the message, the device 130 operates the link that was included (e.g., embedded) in the message, and this operation of the link causes the device 130 to request that the message machine 110 provide the image to which the link refers.

In operation 340, the message machine 110 responds to the device 130 by generating the image referenced by the link. As noted above, the link may contain data sufficient to identify the user 132, identify the previously provided search result (e.g., the airline flight), identify one or more of the search criteria from operation 304, or any suitable combination thereof. Since the message machine 110 has stored the updated price of the search result in the database 115, the message machine 110 may accordingly retrieve the updated price of the search result and incorporate the updated price into the generated image. In operation 341, the message machine 110 provides the generated image to the device 130, in response to the request by the device 130 for the image referenced by the link.

In operation 350, the device 130 presents (e.g., displays) the message (e.g., the self-updating message) that was opened in operation 330. The message may be presented to the user 132 on a screen of the device 130. However, now the message is presented along with the image that depicts the updated price of the search result (e.g., the airline flight). As noted above, the message includes some or all of the search result. In some example embodiments, the message displays both the initial price and the image that depicts the updated price. In certain example embodiments, the message substitutes the image of the updated price for the initial price. Accordingly, the updated price may be presented in the message, with at least some portion of the previously provided search result, even though the updated price was not part of either the message or the search result when the message was generated and sent. As shown by the dashed arrow, in some example embodiments, if the message is reopened at later time (e.g., by repeating operation 330), operation of the link (e.g., by repeating operation 331) may cause regeneration of the image that depicts the updated price (e.g., by repeating operation 340), re-provision of the image (e.g., by repeating operation 341), and re-displaying the message with the regenerated image (e.g., by repeating operation 350).

Although FIG. 3 shows the initial price of the search result expiring after the message has been generated (e.g., by operation 320 occurring after operations 310 and 311), FIG. 4 shows that the initial price may expire prior to the generating of the message (e.g., by operation 320 occurring prior to operations 310 and 311), according to some example embodiments. Hence, various example embodiments of the method 300 may be performed to provide messages that update themselves at the time that they are opened by the device 130, whether the updates are available from the third-party data source 120 before or after the messages are generated and sent.

Figure 5:
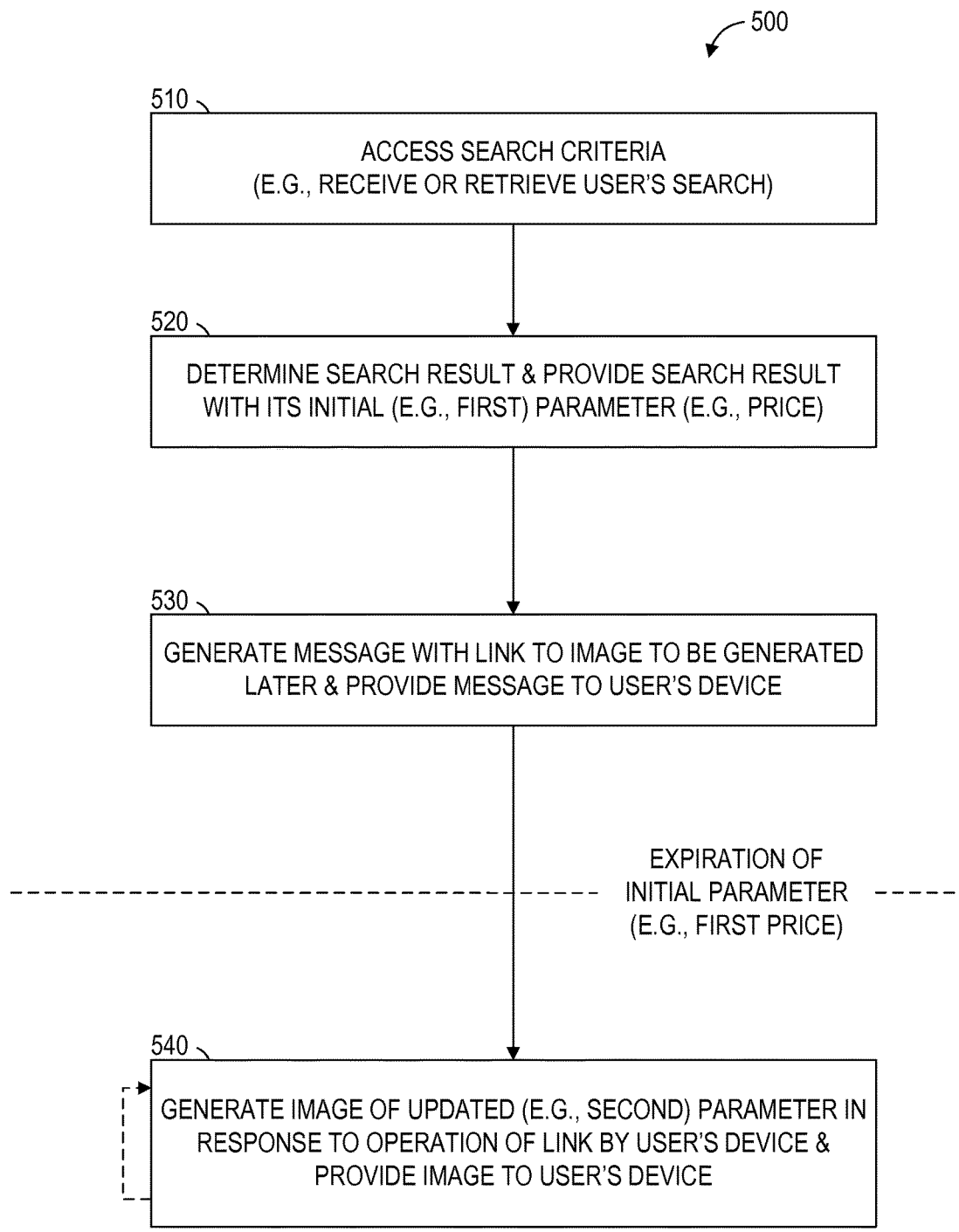
FIGS. 5-10 are flowcharts illustrating operations of the message machine in performing a method of generating a self-updating message, according to various example embodiments.

FIGS. 5-10 are flowcharts illustrating operations of the message machine 110 in performing a method 500 of generating a self-updating message, according to various example embodiments. Operations in the method 500 may be performed by the modules described above with respect to FIG. 2. As shown in FIG. 5, the method 500 may include operations 510, 520, 530, and 540.

In operation 510, the criteria module 210 accesses one or more search criteria that correspond to the user 132. This may include receiving or retrieving a search (e.g., a query for airline flights) submitted by the user 132 to the search engine 118. According to various example embodiments, one or more of these search criteria may be or include a keyword that appears in the search submitted by the user 132, appears in a preference of the user 132 for receiving messages (e.g., alerts), appears in a profile of the user 132 indicating interests of the user, the geolocation of the device 130 (e.g., a city or neighborhood, as detected by geolocation hardware in the device 130), the geolocation of the user 132 (e.g., a city or neighborhood, as reported by the user 132 to one or more social media services or social networking services), a submission by the user 132 to one or more social media websites or social networking websites (e.g., to indicate interest or location), or any suitable combination thereof.

In operation 520, the result module 220 determines and provides a search result based on at least some of the search criteria accessed in operation 510. This may be performed by searching the database 115 for the search result (e.g., a particular airline flight), determining the search result based on at least some of the search criteria, and providing the search result to the device 130. As noted above, the determined search result may correspond to an initial parameter (e.g., a first price of the airline flight), which may be stored in the database 115. The search result (e.g., the airline flight) may be provided with its initial parameter (e.g., with the first price of the airline flight) to the user 132 via the device 130.

In some example embodiments, all of the search criteria accessed in operation 510 contribute to the determining of the search result in operation 520. In other example embodiments, fewer than all of the accessed search criteria (e.g., only one of the search criteria) contribute to the determining of the search result. For example, supposing that three or more search criteria were accessed in operation 510 (e.g., departure city, arrival city, cost, airline, and date for airline flights), the search result may be determined based on only two of the three or more search criteria (e.g., the cheapest flight from any airline on the same date), or based on only one of the three or more search criteria (e.g., the cheapest flight from any airline on any date).

In operation 530, the message module 230 generates and provides a message that presents the previously provided search result (e.g., some or all of the search result provided in operation 520) with a link that is operable to cause generation of an image that depicts an updated parameter of the search result (e.g., an updated price of the search result, after expiration of the initial price of the search result). As illustrated, operation 530 includes generating the message with the link to the image, as well as providing a message to the device 130 of the user 132. As noted above, although the link is provided as part of operation 530 at this point in time, the image to which the link refers is to be generated later (e.g., in response to the link being operated during presentation of the message by the device 130).

In some example embodiments, the link includes information sufficient to identify the previously provided search result, which was determined in operation 520 based on at least some of the search criteria accessed in operation 510. Examples of such information include one or more of the search criteria accessed in operation 510, a hash derived from one or more of the search criteria, an identifier (e.g., a flight number or a product code) of the search result determined in operation 520, a hash derived from the search result, or any suitable combination thereof. In certain example embodiments, the link includes information sufficient to identify the user 132 to whom the search result was previously provided in operation 520. Examples of such information include an identifier (e.g., a user name or an account number) of the user 132, an identifier (e.g., a network address, a hardware address, or a serial number) of the device 130, or any suitable combination thereof. Accordingly, the link may include sufficient data to retrieve, reconstruct, revisit, or otherwise obtain the same search result that was previously provided in operation 520.

As shown in FIG. 5, the initial parameter (e.g., the first price of the airline flight) for the search result may expire at some point between operations 530 and 540. Hence, at this point, the third-party data source 120 and the message machine 110 may have access to the updated parameter (e.g., a second price of the airline flight) for the search result, but the device 130 might not have received any information regarding the updated parameter.

In operation 540, the image module 240 generates and provides the image that is referenced by the link in the message that was generated and provided in operation 530. As noted above, the image depicts the updated parameter, and image module 240 may provide this image to the device 130 in response to the link being operated by the device 130 during presentation of the message by the device 130, which may occur after the expiration of the initial parameter of the search result (e.g., the first price of the airline flight). According to various example embodiments, the provision of the image to the device 130 may cause the device 130 to present the image of the updated parameter (e.g., the second price of the airline flight) for the search result and during display of the message that presents at least some of the search result with the link to the image. Thus, operation 540 may have the effect of providing the updated parameter to the device 130 for presentation with contents of the message (e.g., at least a portion of the search result), despite the updated parameter being unavailable to the device 130 when the message was received by the device 130.

As shown by the dashed arrow, in some example embodiments, if the message is reopened at later time (e.g., by repeating operation 330), operation of the link (e.g., by repeating operation 331) may cause a repetition of operation 540. This may result in regeneration and reprovision of the same image of the same updated parameter. In certain example embodiments, however, one or more additional updates to the parameter have occurred at the third-party data source 120, and repetition of operation 540 may generate and provide a different image that depicts a further parameter that is most current at the time that operation 540 is performed.

Figure 6:
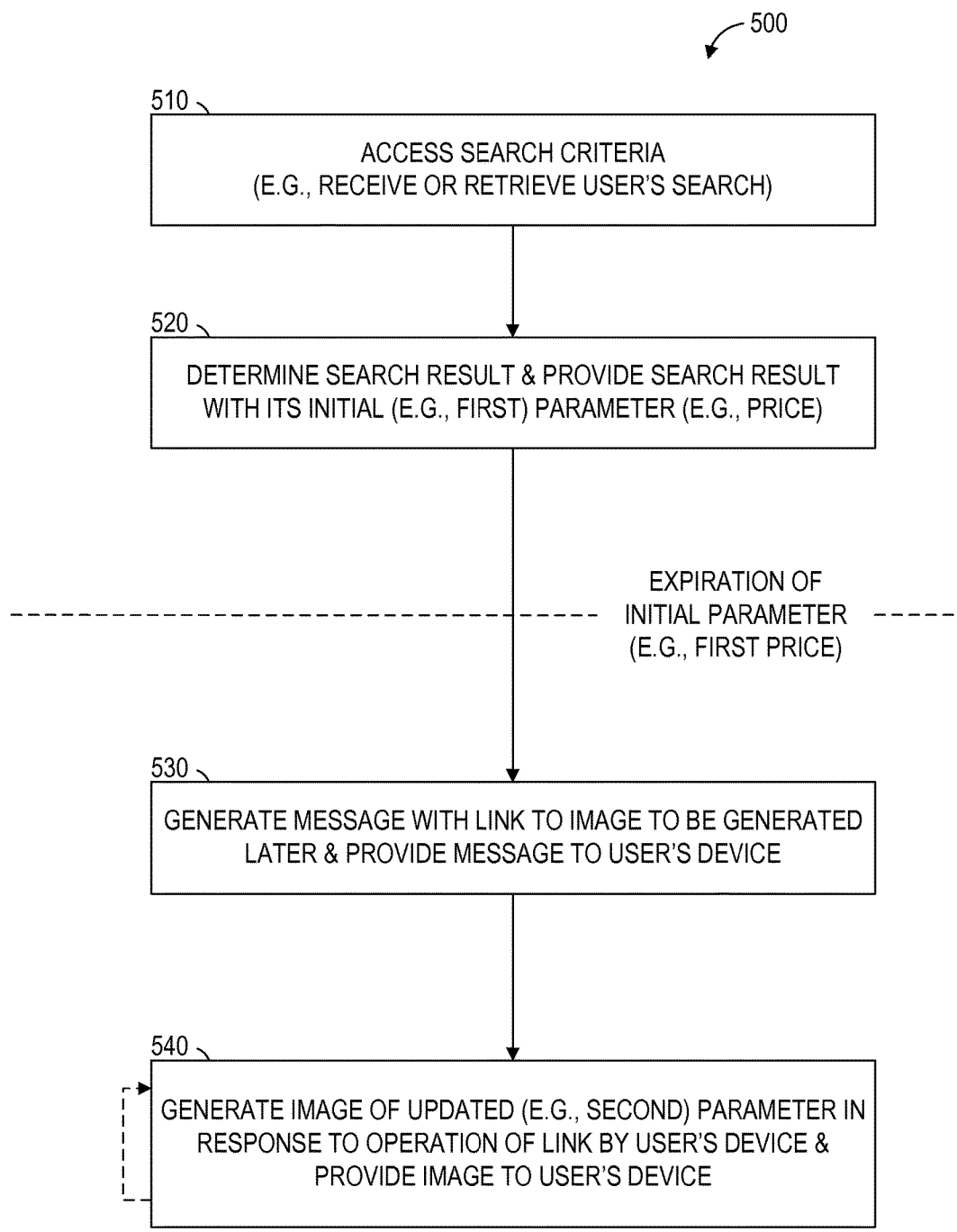

As shown in FIG. 6, the initial parameter (e.g., the first price of the airline flight) of the search result may expire at some point between operations 520 and 530, and the updated parameter (e.g., the second price of the airline flight) may replace or otherwise supersede the initial parameter. Accordingly, operation 540 may have the effect of providing the updated parameter to the device 130 for presentation with the contents of the message (e.g., at least a portion of the search result), regardless of whether the updated parameter was available to the device 130 when the message was received by the device 130.

Figure 7:
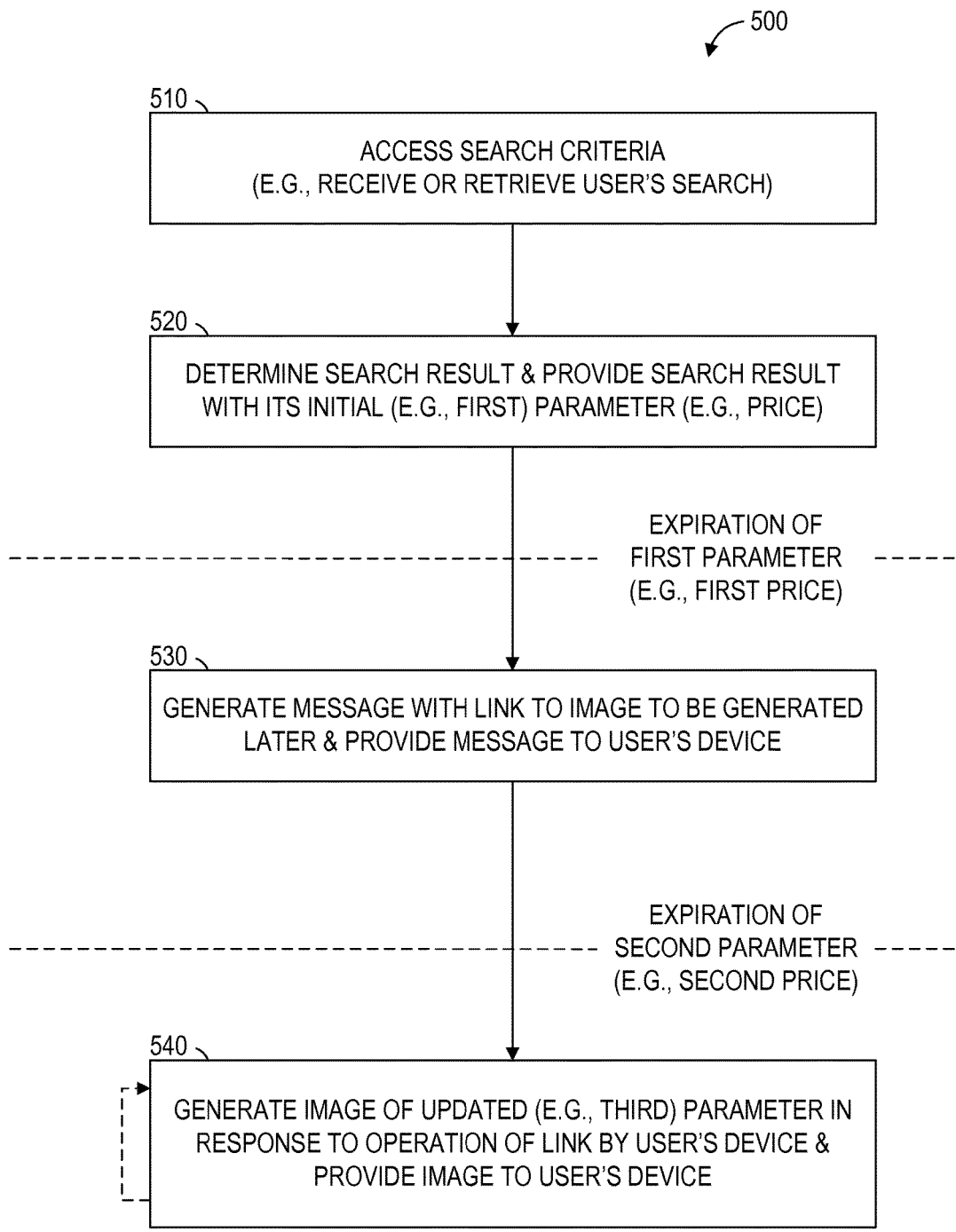

As shown in FIG. 7, the initial parameter (e.g., first price) may be a first parameter that expires at some point between operations 520 and 530, and a second parameter (e.g., second price) that replaces the first parameter may similarly expire at some point between operations 530 and 540 and then be replaced or otherwise superseded by a third parameter (e.g., third price) of the search result. Accordingly, operation 540 may have the effect of providing the third parameter to the device 130 for presentation with the content of the message (e.g., at least a portion of the search result). For example, the expiration of the first parameter (e.g., a first reduction in the fare for the airline flight) may trigger the performance of operation 530 to generate and provide a fare alert to the user 132. This fare alert will not be rendered obsolete by the expiration of the second parameter (e.g., a second reduction in the fare for the airline flight). To the contrary, performance of operation 540 after the expiration of the second parameter may have the effect of providing the most current information to the device 130 by providing the third parameter, instead of the second parameter that was in effect when the message was generated and sent in operation 530. Accordingly, in many situations, the first parameter (e.g., first price) and the third parameter (e.g., third price) have different numerical values (e.g., due to increases or decreases in the fare for the airline flight). However, there may be situations in which the first parameter and the third parameter have the same numerical value (e.g., where the price was changed from the first price but later reverted back to the first price).

As shown by the dashed arrow, in some example embodiments, repetition of operation 540 may generate and provide an even newer image that depicts an even newer parameter (e.g., a fourth parameter, which may be a fourth price of the airline flight). Hence, operation 540 may be repeated each time the message is reopened and the link is operated, which may have the effect of repeatedly updating the message with the most current information (e.g., the most recently updated version of the first parameter, second parameter, third parameter, fourth parameter, etc.).

Figure 8:
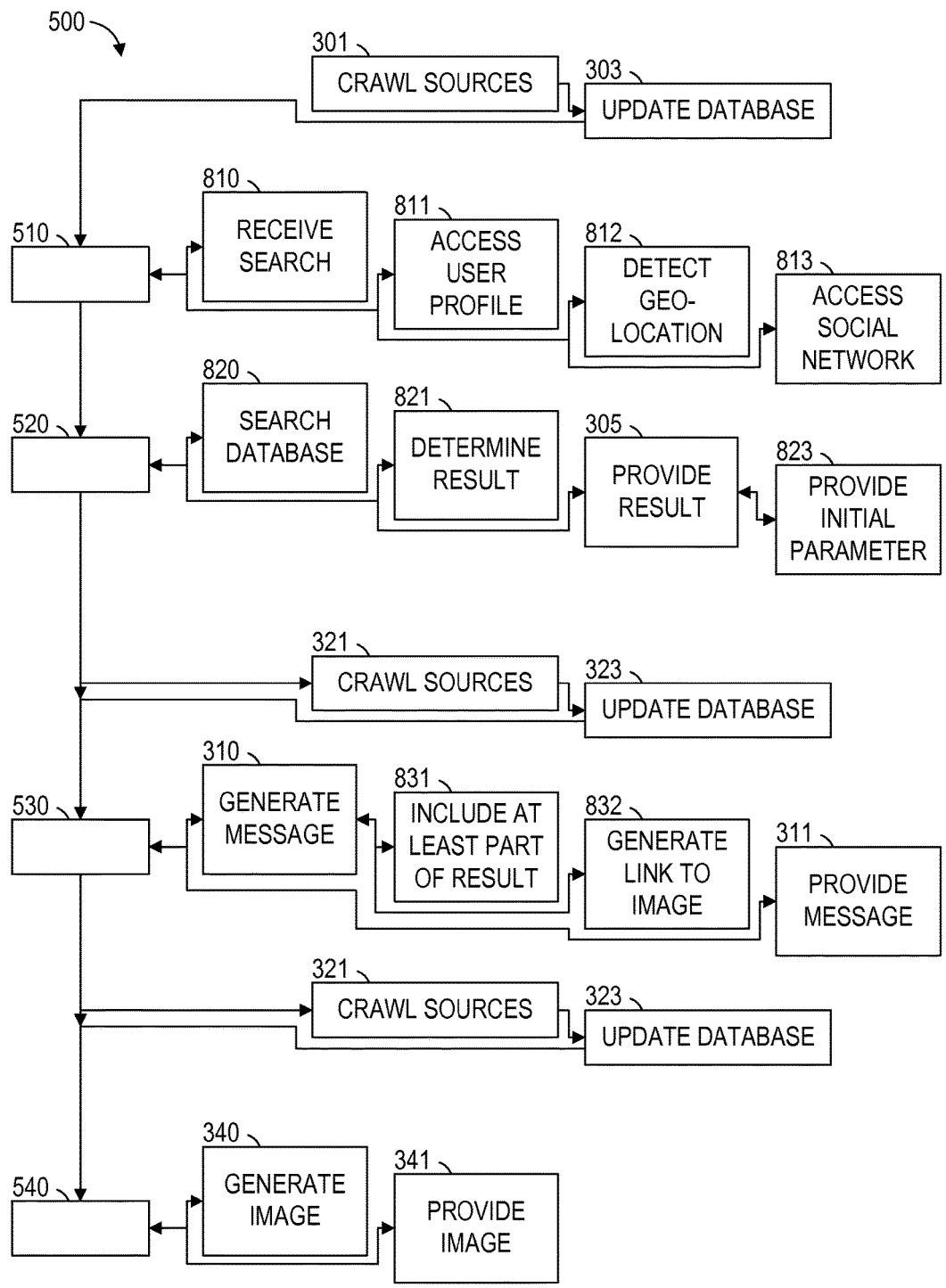

As shown in FIG. 8, the method 500 may include one or more of operations 301, 303, 305, 310, 311, 321, 323, 340, and 341, which were described above with respect to FIGS. 3 and 4. As illustrated, multiple instances of operations 321 and 323 may be included (e.g., in accordance with the discussion above with respect to FIG. 7). In addition, the method 500 may include one or more of operations 810, 811, 812, 813, 820, 821, 823, 831, and 832.

One or more of operations 301 and 303 may be performed by the result module 220 prior to operation 510. As noted above, performance of operation 301 includes accessing the third-party data source 120, and performance of operation 303 includes updating the database 115 with information that later will become the search result determined and provided in operation 520.

One or more of operations 810, 811, 812, and 813 may be performed as part (e.g., a precursor task, a subroutine, or a portion) of operation 510, in which the criteria module 210 accesses the one or more search criteria that correspond to the user 132. In operation 810, the criteria module 210 receives at least some of the search criteria in a search (e.g., a query or other search request) submitted by the user 132 (e.g., by the device 130). For example, one or more of the search criteria may be or include a keyword submitted within such a search.

In operation 811, the criteria module 210 accesses a user profile that describes the user 132 and includes one or more of the search criteria. For example, the database 115 may store a user profile that indicates one or more interests of the user 132, and one or more keywords that define an interest of the user 132 may be accessed from this user profile. Such accessed keywords may be treated as search criteria by the criteria module 210.

In operation 812, the criteria module 210 detects a geolocation of the device 130. In some example embodiments, the geolocation itself constitutes one or more search criteria (e.g., departure city, arrival city, departure neighborhood, arrival neighborhood, departure address, arrival address, departure venue, arrival venue, latitude, longitude, or altitude). As noted above, the geolocation may be detected by geolocation hardware in the device 130 (e.g., global positioning system (GPS) hardware). The criteria module 210 may detect this geolocation by communicating with the device 130. In some example embodiments, the geolocation may be reported by the user 132 (e.g., to the search engine 118 or to one or more web servers, such as those providing social media services or social networking services). The criteria module 210 may detect the reported geolocation by communicating with one or more web servers via the network 190 to access location information submitted to those web servers by the user 132.

In operation 813, the criteria module 210 accesses a submission made by the user 132 to a social networking service (e.g., to a web server that provides the social networking service). In some example embodiments, such a submission includes one or more keywords that the criteria module 210 treats as search criteria in operation 510. For example, the submission may indicate an interest held by the user 132 (e.g., in visiting a particular city or neighborhood, in using a particular airline, in preferring a particular hotel chain, or any suitable combination thereof). The criteria module 210 may thus detect the submission by communicating via the network 190 with one or more web servers to which the submission was made by the user 132.

One or more of operations 820, 821, and 305 may be performed as part of operation 520, in which the result module 220 determines the search result and provide the search result with its initial parameter (e.g., the first price of the airline flight). In operation 820, the result module 220 searches the database 115 using (e.g., based on) one or more of the search criteria accessed in operation 510. In operation 821, the result module 220 determines the search result (e.g., by receiving, retrieving, or otherwise identifying the search result as the output or outcome of the search performed in operation 820).

Operation 305, in which the determined search result (e.g., the airline flight) is provided to the device 130, may be performed by the result module 220, as described above with respect to FIGS. 3 and 4. As shown in FIG. 8, operation 823 may be performed as part of operation 305. In operation 823, the providing of the search result includes providing the initial parameter of the search result (e.g., the first price of the airline flight) to the device 130.

As noted above, one or more instances of operations 321 and 323 may be included in the method 500. As discussed above with respect to FIGS. 3-7, a set of these operations may be performed before operation 530, after operation 530, or both. Performance of a set of these operations 321 and 323 may have the effect of retrieving the updated parameter of the search result (e.g., the second or third price of the airline flight) for inclusion in the image to be generated in operation 540. In some example embodiments, a set of these operations may be performed prior to operation 540. In alternative example embodiments, a set of these operations may be performed as part (e.g., a precursor task, a subroutine, or a portion) of operation 540. As a result, the generating of the image in operation 540 may include retrieving the updated parameter of the search result (e.g., the second or third price of the airline flight) from the database 115. In certain example embodiments, the retrieving of the updated parameter is performed by directly accessing the third-party data source 120, and the image may be generated in operation 540 without first storing the updated parameter the database 115.

One or more of operations 310 and 311 may be performed as part of operation 530, in which the message module 230 generates the message with the link to the image and provides a message to the device 130. As noted above, performance of operation 310 includes generating the message and including a link in the message.

As shown in FIG. 8, one or more of operations 831 and 832 may be performed as part of operation 310. In operation 831, the message module 230 includes at least part of the search result in the message. For example, supposing the airline flight referenced by the search result includes multiple details, the message module 230 may incorporate only a subset of these multiple details (e.g., by omitting some details, truncating some details, abbreviating some details, or any suitable combination thereof) into the generated message.

In operation 832, the message module 230 generates the link to the image (e.g., even though the image is yet to be generated and will be generated later upon operation of the link by the device 130 in opening or presenting the message that contains the link). As noted above, the generated link may include information sufficient to identify the previously provided search result (e.g., the airline flight), information sufficient to identify the user 132, or both. Thus, generation of the link may include building the link such that it alone is sufficient to retrieve or reconstruct the same search result (e.g., the airline flight).

As noted above, performance of operation 311 includes providing the generated message, with the generated link, to the device 130. Thus, performance of operation 311 may complete the performance of operation 530.

One or more of operations 340 and 341 may be performed as part of operation 540, in which the image module 240 generates the image to which the link in the message refers. As noted above, operation 340 includes generating the image referenced by the link, and operation 341 includes providing the generated image to the device 130 (e.g., in response to the request by the device 130 for the image referenced by the link) for presentation with the message.

Figure 9:
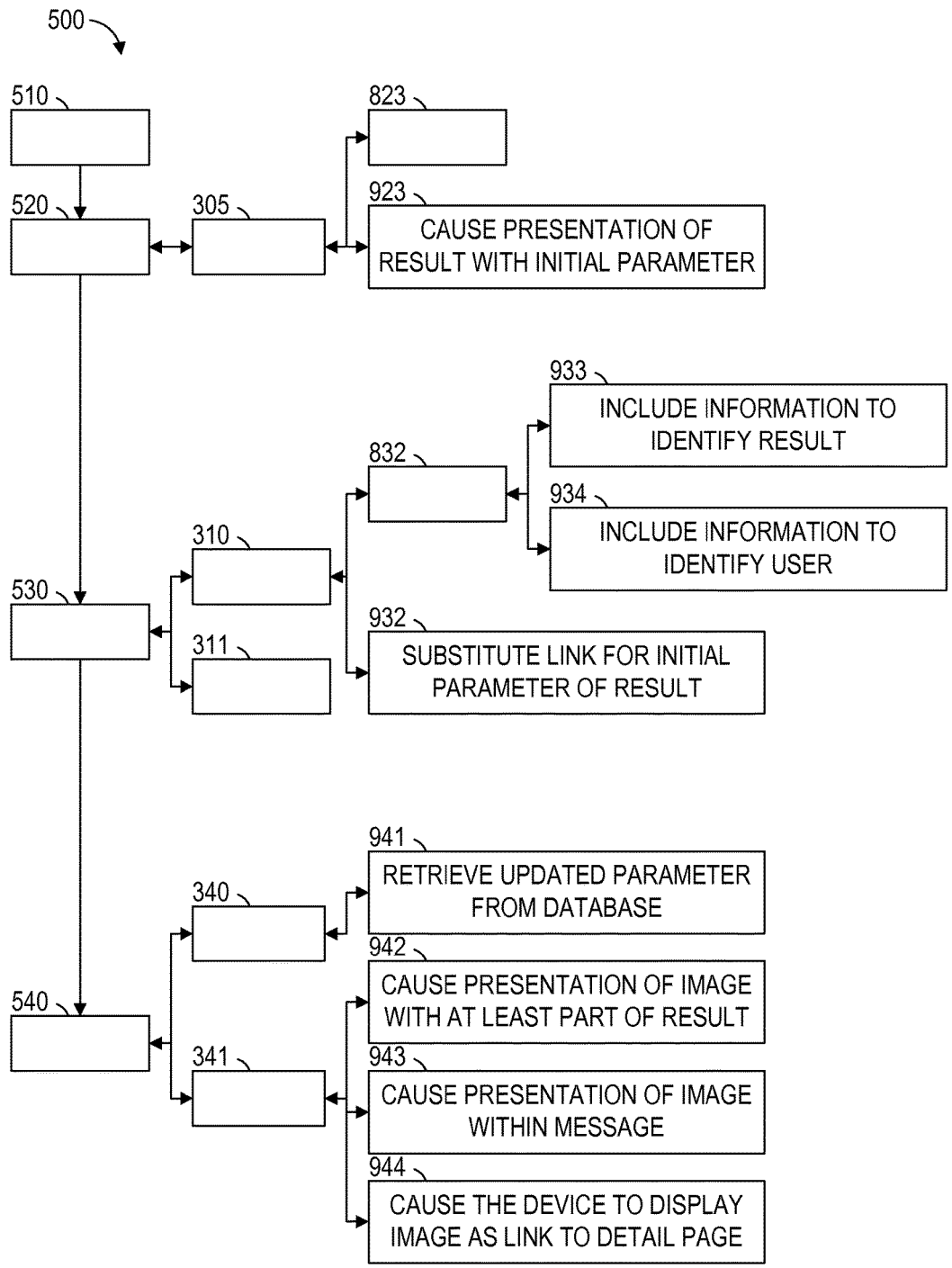

As shown in FIG. 9, in addition to any one or more of the operations previously described, the method 500 may include one or more of operations 923, 932, 933, 934, 941, 942, 943, and 944. As noted above, operation 305 may be performed as part of operation 520, and operation 305 may include operation 823, in which the result module 220 provides the initial parameter of the search result (e.g., the first price of the airline flight) as part of providing the search result to the device 130. As illustrated in FIG. 9, operation 305 may further include operation 923. In operation 923, the providing of the search result includes causing a presentation of the search result (e.g., the airline flight) with the initial parameter (e.g., the first price of the airline flight). For example, the result module 220 may cause the device 130 to present the search result with the initial parameter (e.g., by providing the search result and initial parameter as a response to a query submitted from the device 130).

As noted above, operation 310 may be performed as part of operation 530, and operation 310 may include operation 832, in which the message module 230 generates the link for inclusion in the message. As illustrated in FIG. 9, operation 310 may further include operation 932. In operation 932, the message module 230 substitutes the link for the initial parameter of the search result. For example, the search result (e.g., details regarding the airline flight) may include the initial parameter (e.g., the first price of the airline flight), and in generating the message, the message module 230 may replace the initial parameter with the generated link. Accordingly, the generated message may be an updatable message (e.g., a self-updating message) that presents the search result with the link in lieu of the initial parameter of the search result. In alternative example embodiments, the message module 230 incorporates both the initial parameter and the generated link into the generated message.

As noted above, operation 310 may include operation 832, in which the message module 230 generates the link. As illustrated in FIG. 9, one or more of operations 933 and 934 may be performed as part of operation 832. In operation 933, the message module 230 incorporates information sufficient to identify the search result (e.g., the airline flight) into the generated link. By itself or in combination with operation 934, operation 933 may cause the link alone to have or convey sufficient data to retrieve or reconstruct the same search result (e.g., the same airline flight).

In operation 934, the message module 230 incorporates information sufficient to identify the user 132 into the generated link. By itself or in combination with operation 933, operation 934 may cause the link alone to have or convey sufficient data to retrieve or reconstruct the same search result (e.g., the same airline flight) that was previously determined and provided in operation 520.

As shown in FIG. 9, operation 941 may be performed as part of operation 340, in which the image module 240 generates the image that is referenced by the link that was included in the message (e.g., the self-updating message). As noted above with respect to the inclusion of operations 321 and 323 within the method 500, the generating of the image in operation 540 may include retrieving the updated parameter of the search result (e.g., the second or third price of the airline flight) from the database 115. In certain example embodiments, performance of operation 941 performs or includes this retrieval of the updated parameter from the database 115.

One or more of operations 942, 943, and 944 may be performed as part (e.g., a precursor task, a subroutine, or a portion) of operation 341, in which the image module 240 provides the device 130 with the generated image that is referenced by the link and depicts the updated parameter (e.g., the second or third price of the airline flight). In operation 942, the image module 240 causes the device 130 to present (e.g., display) the image along with the previously provided search result (e.g., the airline flight) or one or more portions of the search result (e.g., one or more details regarding the airline flight). This may have the effect of causing the device 130 to display the generated image contemporaneously with at least part of the search result.

In operation 943, the image module 240 causes the device 130 to present the image within (e.g., inside or otherwise included in) the message. This may be performed by displaying the image as an inline picture within the message (e.g., including adjusting any text of the message, such as, by word wrapping text around the image). In example embodiments that include operation 932, in which the link is substituted for the initial parameter (e.g., the first price), performance of operation 943 may include displaying the image (e.g., depicting the second price or the third price) instead of the initial parameter, and the displayed image may occupy a location within the message that was previously occupied by the initial parameter.

In operation 944, the image module 240 causes the device 130 to present the image as a further link (e.g., a second link) to a webpage that provides additional details regarding the search result (e.g., a detail page for the airline flight). The webpage may describe the search result (e.g., the airline flight) and its updated parameter (e.g., the second or third price of the airline flight) in equal or greater detail than the message. In some example embodiments, the webpage is or includes an electronic storefront that is configured to initiate one or more transactions with respect to the search result. For example, the webpage may enable the user 132 to purchase or reserve the airline flight (e.g., at the depicted second or third price of the airline flight). Accordingly, according to certain example embodiments, the user 132 may activate the image (e.g., by clicking on it, tapping on it, touching it, or otherwise selecting it for activation) while the image is being presented by the device 130, and this activation of the image may cause the device 130 to request and load the webpage for subsequent display to the user 132, as well as initiation of one or more transactions or other interactions with the user 132.

Figure 10:
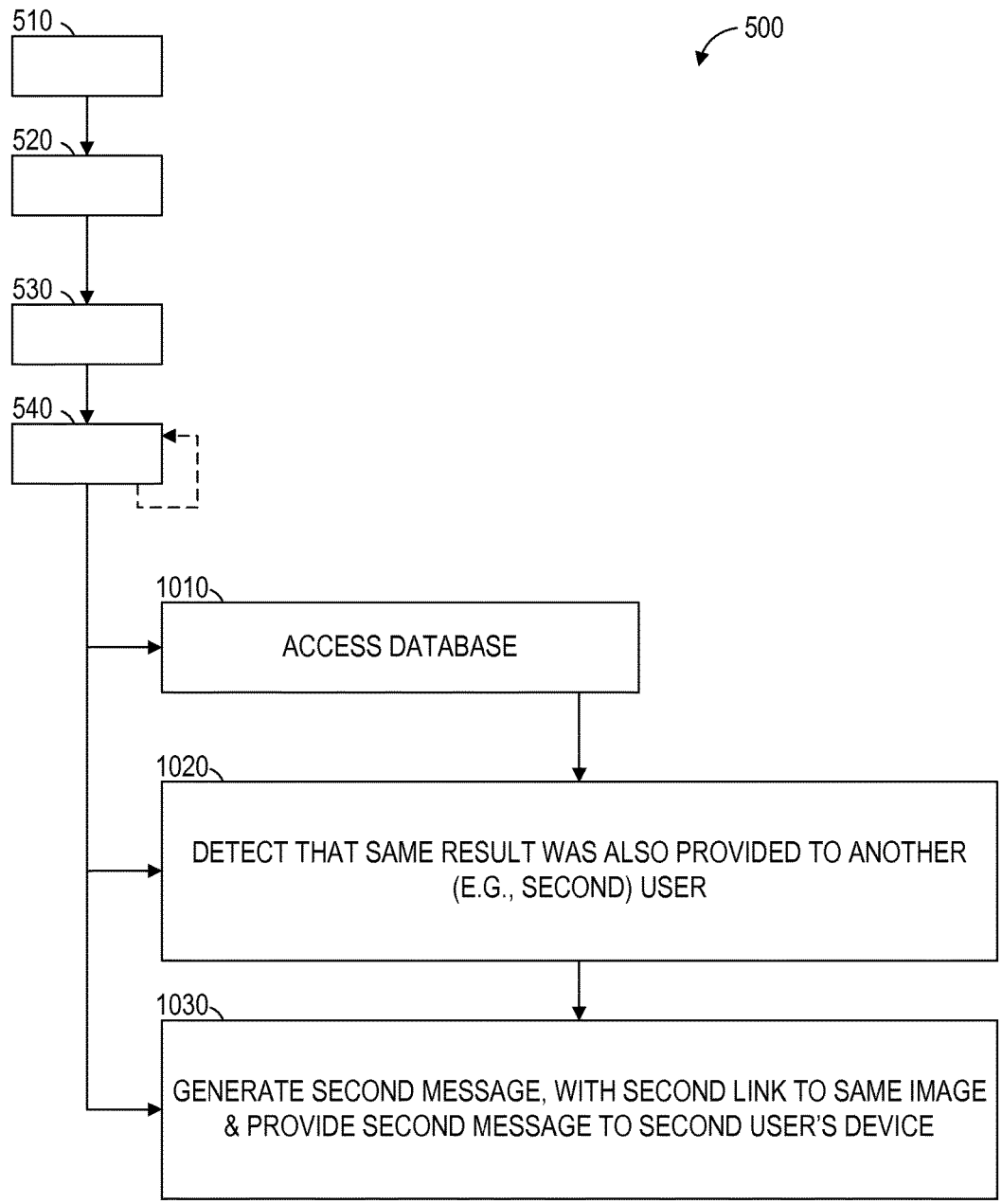

As shown in FIG. 10, in addition to any one or more of the operations previously described, the method 500 may include one or more of operations 1010, 1020, and 1030. As illustrated, one or more of operations 1010, 1020, and 1030 may be performed after operation 530, operation 540, or both.

In operation 1010, the message module 230 accesses the database 115, which in some example embodiments may store an indication that the same search result (e.g., the airline flight) was also provided to a different user who performed a different search or performed the same search at a different time, via a different device, or both. For example, the database 115 may store an indication that the user 152 had previously received the same search result (e.g., the airline flight) that was previously provided to the user 132. The database 115 may store such an indication within a log file for the search engine 118, within a user profile (e.g., search history) of the user 152, or any suitable combination thereof.

In operation 1020, the message module 230 detects that this same search result (e.g., the airline flight) that was previously provided in operation 521 was also previously provided to the other user (e.g., user 152) via a device of the other user (e.g., device 150). This detection may be performed based on the indication accessed in operation 1010.

In operation 1030, the message module 230 generates a further message (e.g., a second message) that includes a further link (e.g., a second or third link) to the same image generated in operation 540. This may enable the message machine 110 to reuse the same image in additional messages that are generated and sent to additional users beyond the user 132. In some example embodiments, the further link is the same as the link previously discussed with respect to operation 530. In certain example embodiments, the further link is different from the link previously discussed with respect operation 530, but nonetheless refers to the same generated image that depicts the updated parameter of the search result (e.g., the second or third price of the airline flight). Accordingly, in various example embodiments, the further link alone may have or convey sufficient data to retrieve or reconstruct the same search result (e.g., the airline flight or details thereof). However, in some example embodiments, the further link alone is only sufficient to identify and obtain the generated image, and is not sufficient to retrieve or reconstruct the same search result. Moreover, in various example embodiments, operation of the further link by the device 150 in opening or reopening the further message causes the image module 240 to generate and provide an even newer image that depicts an even newer parameter (e.g., a twice-updated parameter, which may be a third or fourth price of the airline flight, or a thrice-updated parameter, etc.) to the device 150. Thus, performing one or more of operations 1010, 1020, and 1030 may enable the user 152 (e.g., a second user) to receive a self-updating message similar to the self-updating message provided to the user 132 (e.g., a first user), with reduced computational expense compared to repeating operations 510, 520, 530, and 540 for the user 152.

Figure 11:
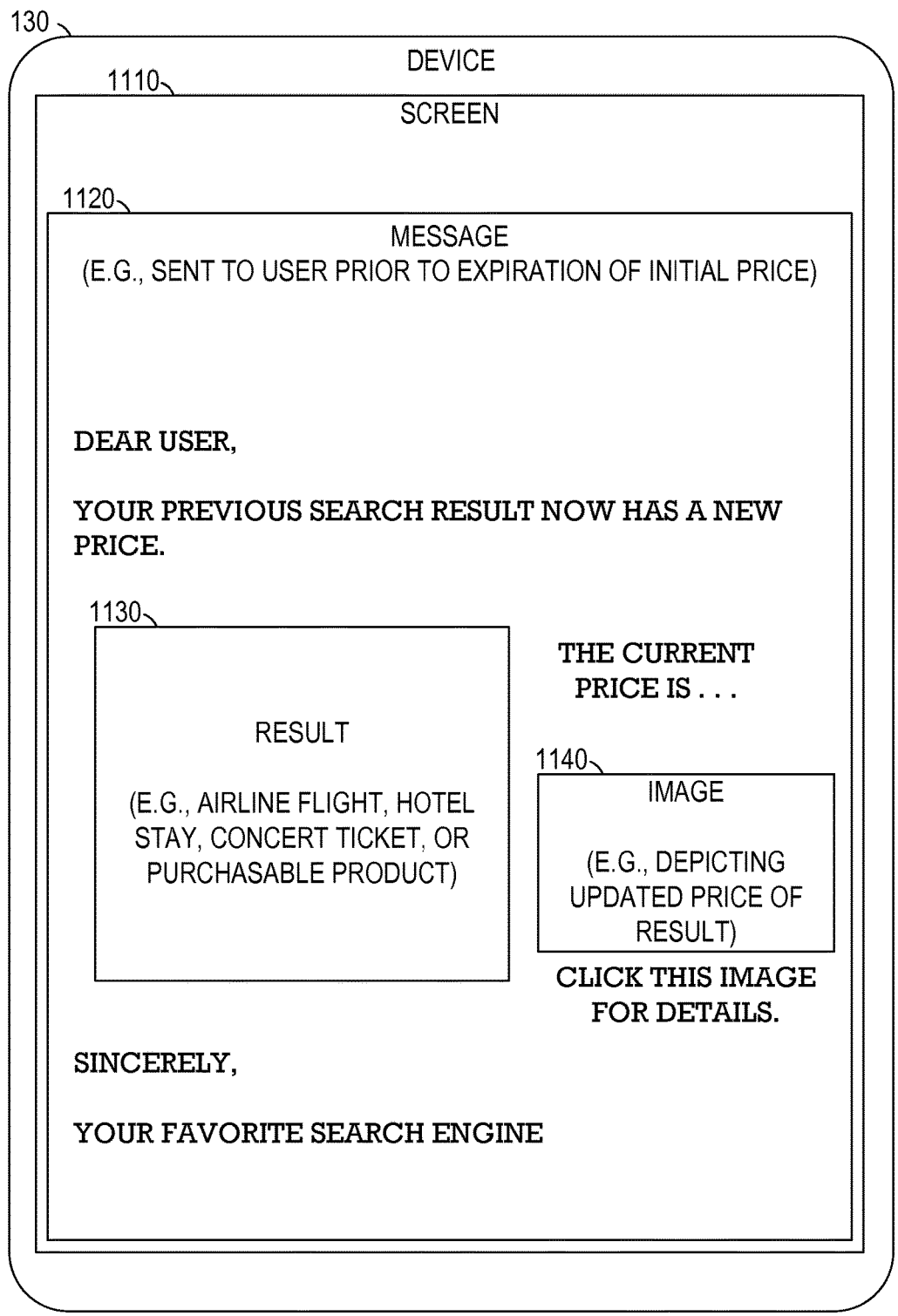
FIGS. 11 and 12 are face views of a device presenting self-updated messages, according to some example embodiments.
Figure 12:
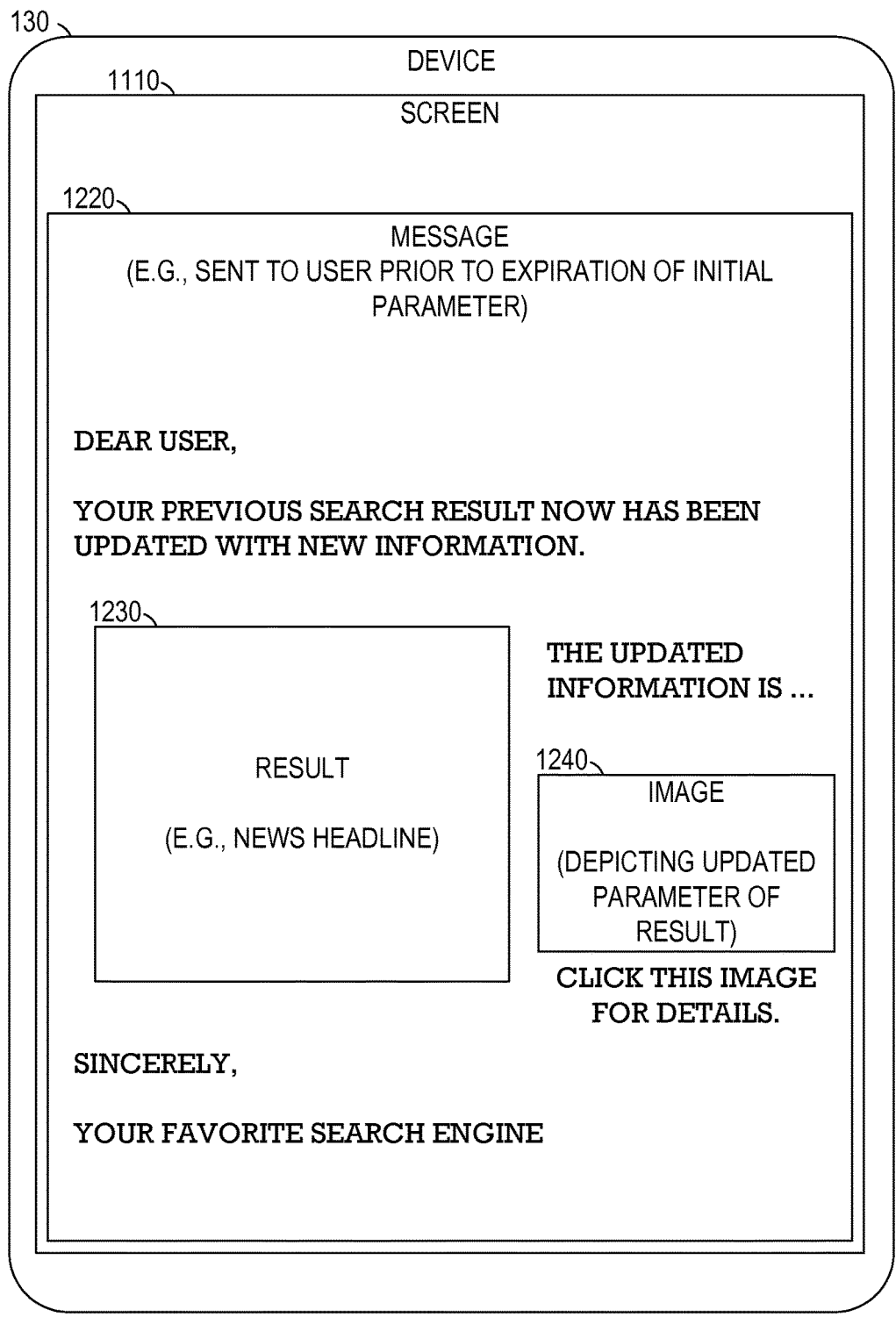

FIGS. 11 and 12 are face views of the device 130 as it displays self-updated messages 1120 and 1220, according to some example embodiments. As shown in FIG. 11, the device 130 may include a screen 1110 (e.g., a display screen, such as a touch screen or other screen capable of rendering text and images). In accordance with usage of the device 130 by the user 132, the screen 1110 may display the message 1120, which may have been generated according to the method 500, received by the device 130, and opened for display by the device 130 (e.g., as requested or commanded by the user 132).

The message 1120 is an example of a message that presents a search result obtained from the search engine 118, which may be or include a travel search engine, an entertainment search engine, a shopping search engine, or any suitable combination thereof. Moreover, FIG. 11 illustrates the message 1120 in a post-update state, after its self-updating aspect has been utilized. As noted in FIG. 11, the message 1120 may have been sent and received prior to expiration of the initial parameter (e.g., an initial price or first price) of a search result 1130 (e.g., an airline flight, a hotel stay, a concert ticket, or purchasable product).

The search result 1130 is presented (e.g., by inclusion) within the message 1120. At the times at which the message 1120 was generated by the message machine 110, sent to the device 130, and received by the device 130, the message 1120 included a link to an image 1140, which had not yet been generated at that point. However, as shown in FIG. 11, in opening the message 1120 for presentation, the device 130 operated the link, which triggered performance of operation 540 by the image module 240 of the message machine 110 (e.g., by requesting the image 1140). As a result, the image 1140 was provided by the image module 240 to the device 130, and the device 130 is now displaying the image 1140 within the message 1120 (e.g., in accordance with markup code or other commands embedded into the message 1120). Thus, with the visual inclusion of the image 1140 with the search result 1130 in the message 1120, the message 1120 may be or appear as a self-updating message that has been self-updated, from the perspective of the device 130, the user 132, or both. According to various example embodiments, the device 150 may function similarly in this regard (e.g., with respect to operation 1030).

As shown in FIG. 12, the device 130 and its screen 1110 may display the message 1220, which may have been generated according to the method 500, received by the device 130, and opened for display by the device 130 (e.g., as directed by the user 132).

The message 1220 is an example of a message that presents the search result obtained from a news search engine (e.g., search engine 1118). Moreover, FIG. 12 illustrates the message 1220 in a post-update state, after its self-updating aspect has been utilized. As noted in FIG. 12, the message 1220 may have been sent and received prior to expiration of the initial parameter (e.g., an initial sub-headline or a first sub-headline) of a search result 1230 (e.g., a news headline for a news article).

The search result 1230 is presented (e.g., by inclusion) within the message 1220. During the times at which the message 1220 was generated by the message machine 110, sent to the device 130, and received by the device 130, the message 1220 included a link to an image 1240, which had not yet been generated at that point. However, as shown in FIG. 12, in opening the message 1220 for presentation, the device 130 operated the link, which triggered performance of operation 540 by the image module 240 of the message machine 110 (e.g., by requesting the image 1240). As a result, the image 1240 was provided by the image module 240 to the device 130, and the device 130 is now displaying the image 1240 within the message 1220 (e.g., in accordance with markup code or other commands embedded into the message 1220). Thus, with the visual inclusion of the image 1240 with the search result 1230 in the message 1220, the message 1220 may be or appear as a self-updating message that has been self-updated, from the standpoint of the device 130, the user 132, or both. According to various example embodiments, the device 150 may function similarly in this regard (e.g., with respect to operation 1030).

According to various example embodiments, one or more of the methodologies described herein may facilitate machine-generation and machine-provision of a self-updating message. Moreover, one or more of the methodologies described herein may facilitate providing one or more users with messages that include and convey the most current information (e.g., parameters) regarding a search result, even if that information was not available (e.g., did not exist) at the time that the messages were provided to the one or more users. Hence, one or more of the methodologies described herein may facilitate provision of accurate (e.g., updated) information regarding a search result, even in situations where the information regarding the search result frequently changes, without generating and sending a separate message every time that information changes.

When these effects are considered in aggregate, one or more of the methodologies described herein may obviate a need for certain efforts or resources that otherwise would be involved in generation and provision of a self-updating message by a machine. Efforts expended by a user in obtaining accurate (e.g., updated) information regarding a search result may be reduced by use of (e.g., reliance upon) a machine that implements one or more of the methodologies described herein. Computing resources used by one or more machines, databases, or devices (e.g., within the network environment 100) may similarly be reduced (e.g., compared to machines, databases, or devices that lack one or more the methodologies described herein). Examples of such computing resources include processor cycles, network traffic, memory usage, data storage capacity, power consumption, and cooling capacity.

Figure 13:
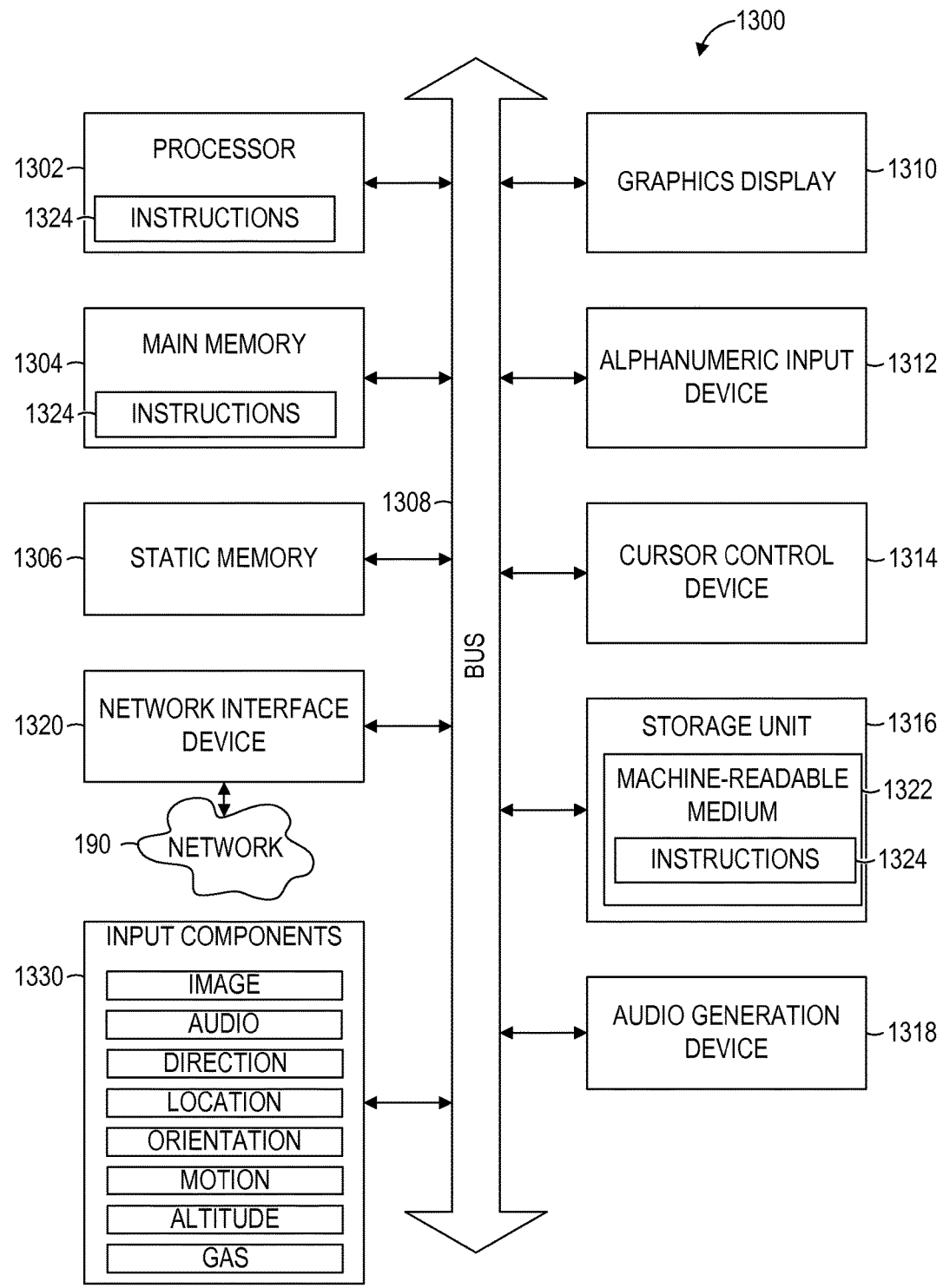
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be communicatively coupled (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein. In some example embodiments, the processor 1302 is a multicore CPU (e.g., a dual-core CPU, a quad-core CPU, or a 128-core CPU) within which each of multiple cores is a separate processor that is able to perform any one or more the methodologies discussed herein, in whole or in part.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone or tablet computer, and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof. In some example embodiments, the instructions 1324 for execution by the machine 1300 may be carried by a carrier medium. Examples of such a carrier medium include a storage medium and a transient medium (e.g., a signal carrying the instructions 1324).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., apparatus) discussed herein.

A first embodiment provides a method comprising: by operation of a message machine comprising processors, accessing search criteria that correspond to a user;
by operation of the message machine comprising the processors, determining and providing a search result based on at least some of the accessed search criteria, the search result having an initial price and being provided with the initial price to the user by the message machine;
by operation of the message machine comprising the processors, generating and providing a message that presents the previously provided search result with a link that is operable to cause generation of an image that depicts an updated price of the search result after expiration of the initial price of the search result, the generating of the message being performed by at least a first processor among the processors of the message machine, the generated message being provided to a device of the user to whom the search result was previously provided; and
by operation of the message machine comprising the processors, generating and providing the image of the updated price of the search result, the image of the updated price being provided to the device of the user and presented by the device both after the expiration of the initial price of the search result and during display of the message that presents the search result with the link, the generating of the image being performed by at least a second processor among the processors of the message machine and in response to operation of the link by the device in displaying the message after the expiration of the initial price of the search result.

A second embodiment provides a method according to the first embodiment, wherein:
the link that is operable to cause generation of the image that depicts the updated price of the search result includes information sufficient to identify the previously provided search result determined based on at least some of the accessed search criteria.

A third embodiment provides a method according to the first embodiment or the second embodiment, wherein:
the link that is operable to cause generation of the image that depicts the updated price of the search result includes information sufficient to identify the user to whom the search result was previously provided.

A fourth embodiment provides a method according to any combination of the first through third embodiments, wherein:
the providing of the search result includes causing a presentation of the search result with the initial price of the search result; and
the generating of the message generates an updatable (e.g., self-updating or self-updatable) message that presents the previously provided search result with the link in lieu of the initial price of the search result.

A fifth embodiment provides a method according to any combination of the first through fourth embodiments, wherein:
the providing of the search result includes causing a presentation of the search result with the initial price of the search result; and
the providing of the image of the updated price of the search result includes causing the device of the user to display the image of the updated price with the previously provided search result.

A sixth embodiment provides a method according to any combination of the first through fifth embodiments, wherein:
the providing of the search result includes causing a presentation of the search result with the initial price of the search result; and
the providing of the image of the updated price of the search result includes causing the device of the user to display the image of the updated price within the message.

A seventh embodiment provides a method according to any combination the first through sixth embodiments, wherein:
the providing of the image of the updated price of the search result includes causing the device of the user to display the image of the updated price as a further link that is operable to request a webpage that describes the search result and its updated price.

An eighth embodiment provides a method according to any combination of the first to seventh embodiment, wherein:
the determining of the search result occurs at a first time at which the search result has the initial price and prior to the expiration of the initial price; and
the generating of the message that presents the previously provided search result occurs at a second time at which the search result still has the initial price prior to the expiration of the initial price.

A ninth embodiment provides a method according to any combination of the first through eighth embodiments, wherein:
the determining of the search result occurs at a first time at which the search result has the initial price and prior to the expiration of the initial price; and
the generating of the message that presents the previously provided search result occurs at a second time at which the search result has the updated price subsequent to the expiration of the initial price.

A tenth embodiment provides a method according to any combination of the first through ninth embodiments, wherein:
the determining of the search result occurs at a first time at which the search result has the initial price and prior to the expiration of the initial price; and
the generating of the image that depicts the updated price of the previously provided search result occurs at a second time at which the search result has the updated price subsequent to the expiration of the initial price.

An eleventh embodiment provides a method according to any combination of the first through tenth embodiments, wherein:
the accessing of the search criteria that correspond to the user includes receiving the search criteria in a query submitted by the user.

A twelfth embodiment provides a method according to any combination of the first through eleventh embodiments, wherein:

the accessing of the search criteria that correspond to the user includes accessing a user profile that describes the user and includes the search criteria.

A thirteenth embodiment provides a method according to any combination of the first through twelfth embodiments, wherein:
the accessing of the search criteria that correspond to the user includes detecting a geolocation of the device of the user, the geolocation being a search criterion among the search criteria.

A fourteenth embodiment provides a method according to any combination of the first through thirteenth embodiments, wherein:
the accessing of the search criteria that correspond to the user includes accessing a submission by the user to a social networking service, the submission being a search criterion among the search criteria.

A fifteenth embodiment provides a method according to any combination of the first through fourteenth embodiments, wherein:
the user to whom the search result was previously provided is a first user;
the generated message provided to the device of the first user is a first message; and the method further comprises:
detecting that the search result was previously provided to a second user; and
generating and providing a second message that presents the search result with the image of the updated price of the search result, the generated second message being provided to a device of the second user based on the search result having been previously provided to the second user.

A sixteenth embodiment provides a method according to any combination of the first through fifteenth embodiments, wherein:
the determining of the search result is based on less than all of the accessed search criteria that corresponds to the user.

A seventeenth embodiment provides a method according to any combination of the first through sixteenth embodiments, wherein:
the search result and its updated price are both descriptive of a travel option that includes at least one of an airline flight, a car rental, a train ticket, a bus ticket, a ferry ticket, a hotel stay, or trip insurance.

An eighteenth embodiment provides a method according to any combination of the first through seventeenth embodiments, wherein:
the search result and its updated price are both descriptive of a purchase option that includes at least one of a purchasable item, a purchasable service, a reservation to purchase an item, a reservation to purchase a service, or downloadable data.

A nineteenth embodiment provides a method according to any combination of the first through eighteenth embodiments, wherein:
the generating of the image of the updated price of the search result includes retrieving the updated price for inclusion in the image, the updated price being a current price of the search result at the time of the retrieving.

A twentieth embodiment provides a method according to any combination of the first through nineteenth embodiments, wherein:
the initial price and the updated price have different numerical values.

A twenty-first embodiment provides a method according to any combination of the first through twentieth embodiments, wherein:
the first and second processors of the machine are different cores in a multicore central processing unit (CPU).

A twenty-second embodiment provides a non-transitory machine-readable storage medium comprising instructions that, when executed by one or more processors of a machine, cause the machine to perform operations comprising:
by operation of the machine comprising processors, accessing search criteria that correspond to a user;
by operation of the machine comprising the processors, determining and providing a search result based on at least some of the accessed search criteria, the search result having an initial price and being provided with the initial price to the user by the message machine;
by operation of the machine comprising the processors, generating and providing a message that presents the previously provided search result with a link that is operable after expiration of the initial price of the search result to generate an image that depicts an updated price of the search result, the generating of the message being performed by at least a first processor among the processors of the machine, the generated message being provided to a device of the user to whom the search result was previously provided; and
by operation of the machine comprising the processors, generating and providing the image of the updated price of the search result, the image of the updated price being provided to the device of the user and presented by the device both after the expiration of the initial price of the search result and during display of the message that presents the search result with the link, the generating of the image being performed by at least a second processor among the processors of the machine and in response to operation of the link by the device in displaying the message after the expiration of the initial price of the search result.

A twenty-third embodiment provides a non-transitory machine-readable storage medium of the twenty-second embodiment, wherein:
the providing of the search result includes causing a presentation of the search result with the initial price of the search result; and
the generating of the message generates an updatable (e.g., self-updating or self-updatable) message that presents the previously provided search result with the link in lieu of the initial price of the search result.

A twenty-fourth embodiment provides a system comprising:
processors;
a criteria module comprising at least one processor among the processors and configured to access search criteria that correspond to a user;
a result module comprising at least one processor among the processors and configured to determine and provide a search result based on at least some of the accessed search criteria, the search result having an initial price and being provided with the initial price to the user by the system;
a message module comprising at least a first processor among the processors and configured to generate and provide a message that presents the previously provided search result with a link that is operable after expiration of the initial price of the search result to generate an image that depicts an updated price of the search result, the generating of the message being performed by at least a first processor among the processors, the generated message being provided to a device of the user to whom the search result was previously provided; and
an image module comprising at least a second processor among the processors and configured to generate and provide the image of the updated price of the search result, the image of the updated price being provided to the device of the user and presented by the device both after the expiration of the initial price of the search result and during display of the message that presents the search result with the link, the generating of the image being performed by at least a second processor among the processors and in response to operation of the link by the device in displaying the message after the expiration of the initial price of the search result.

A twenty-fifth embodiment provides a system according to the twenty-fourth embodiment, wherein:
the result module, in being configured to provide the search result, is configured to cause a presentation of the search result with the initial price of the search result; and
the image module, in being configured to provide the image of the updated price of the search result, is configured to cause the device of the user to display the image of the updated price with the previously provided search result.

A twenty-sixth embodiment provides a carrier medium carrying machine-readable instructions for controlling a machine to carry out the method of any one or more of the first through twenty-first embodiments.

A twenty-seventh embodiment provides a non-transitory machine-readable storage medium comprising instructions that, when executed by one or more processors of a machine, cause the machine to perform the method of any one or more of the first through twenty-first embodiments.

What is claimed is:

1. A method comprising:
by a message machine comprising one or more processors, accessing one or more search criteria that correspond to a user;
by the message machine comprising the one or more processors, determining and providing a search result based on the accessed one or more search criteria, the search result being provided to the user and including an initial value that is subject to expiration;
by the message machine comprising the one or more processors, generating a link that identifies the previously provided search result and refers to a location for an image yet to be generated;
by the message machine comprising the one or more processors, generating and providing a message that presents the previously provided search result with the generated link that identifies the previously provided search result and refers to the location for the image to be generated, the generated message being provided to a device of the user;
by the message machine comprising the one or more processors, accessing and storing an updated value of the previously provided search result after expiration of the initial value of the previously provided search result; and
by the message machine comprising the one or more processors, responding to operation of the link in the message by the device while opening the message by generating and providing the image to whose location the link refers, the generated and provided image depicting the updated value of the previously provided search result that is being presented by the message and is identified by the link, the image of the updated value being provided to the device and causing the device to present the image of the updated value after the expiration of the initial value and within the message that presents the previously provided search result with the link that identifies the previously provided search result and refers to the location for the image.

2. The method of claim 1, wherein:
the link includes information that identifies the user to whom the search result was previously provided.

3. The method of claim 1, wherein:
the providing of the search result includes causing a presentation of the search result with the initial value in the search result; and
the generated message presents the previously provided search result with the link in lieu of the initial value in the search result.

4. The method of claim 1, wherein:
the providing of the search result includes causing a presentation of the search result with the initial value in the search result; and
the providing of the image of the updated value of the search result includes causing the device of the user to display the image of the updated value with the previously provided search result.

5. The method of claim 1, wherein:
the providing of the search result includes causing a presentation of the search result with the initial value in the search result; and
the providing of the image of the updated price of the search result includes causing the device of the user to display the image of the updated value within the message.

6. The method of claim 1, wherein:
the providing of the image of the updated value in the search result includes causing the device of the user to display the image of the updated value as a further link that is operable to request a webpage that describes the search result and its updated value.

7. The method of claim 1, wherein:
the determining of the search result occurs at a first time at which the search result has the initial value and prior to the expiration of the initial value; and
the generating of the message that presents the previously provided search result occurs at a second time at which the search result still has the initial value prior to the expiration of the initial value.

8. The method of claim 1, wherein:
the determining of the search result occurs at a first time at which the search result has the initial value and prior to the expiration of the initial value; and
the generating of the message that presents the previously provided search result occurs at a second time at which the search result has the updated value subsequent to the expiration of the initial value.

9. The method of claim 1, wherein:
the determining of the search result occurs at a first time at which the search result has the initial value and prior to the expiration of the initial value; and
the generating of the image that depicts the updated value in the previously provided search result occurs at a second time at which the search result has the updated value subsequent to the expiration of the initial value.

10. The method of claim 1, wherein:
the accessing of the one or more search criteria that correspond to the user includes receiving the one or more search criteria in a query submitted by the user.

11. The method of claim 1, wherein:
the accessing of the one or more search criteria that correspond to the user includes accessing a user profile that describes the user and includes the one or more search criteria.

12. The method of claim 1, wherein:
the accessing of the one or more search criteria that correspond to the user includes detecting a geolocation of the device of the user, the geolocation being a search criterion among the one or more search criteria.

13. The method of claim 1, wherein:
the accessing of the one or more search criteria that correspond to the user includes accessing a submission by the user to a social networking service, the submission being a search criterion among the one or more search criteria.

14. The method of claim 1, wherein:
the user to whom the search result was previously provided is a first user;
the generated message provided to the device of the first user is a first message; and the method further comprises:
detecting that the search result was previously provided to a second user; and
generating and providing a second message that presents the search result with the image of the updated value of the search result, the generated second message being provided to a device of the second user based on the search result having been previously provided to the second user.

15. The method of claim 1, wherein:
the search result and its updated value are both descriptive of a travel option that includes at least one of an airline flight, a car rental, a train ticket, a bus ticket, a ferry ticket, a hotel stay, or trip insurance.

16. The method of claim 1, wherein:
the search result and its updated value are both descriptive of a purchase option that includes at least one of a purchasable item, a purchasable service, a reservation to purchase an item, a reservation to purchase a service, or downloadable data.

17. The method of claim 1, wherein:
the generating of the image of the updated value of the search result includes retrieving the updated value for inclusion in the image, the updated value being a current value of the search result at the time of the retrieving.

18. A non-transitory machine-readable storage medium comprising instructions that, when executed by one or more processors of a machine, cause the machine to perform operations comprising:
accessing one or more search criteria that correspond to a user;
determining and providing a search result based on the accessed one or more search criteria, the search result being provided to the user and including an initial value that is subject to expiration;
generating a link that identifies the previously provided search result and refers to a location for an image yet to be generated;
generating and providing a message that presents the previously provided search result with the generated link that identifies the previously provided search result and refers to the location for the image to be generated, the generated message being provided to a device of the user;
accessing and storing an updated value of the previously provided search result after expiration of the initial value of the previously provided search result; and
responding to operation of the link in the message by the device while opening the message by generating and providing the image to whose location the link refers, the generated and provided image depicting the updated value of the previously provided search result that is being presented by the message and is identified by the link, the image of the updated value being provided to the device and causing the device to present the image of the updated value after the expiration of the initial value and within the message that presents the previously provided search result with the link that identifies the previously provided search result and refers to the location for the image.

19. The non-transitory machine-readable storage medium of claim 18, wherein:
the providing of the search result includes causing a presentation of the search result with the initial value in the search result; and
the generated message presents the previously provided search result with the link in lieu of the initial value in the search result.

20. A system comprising:
one or more processors;
a criteria module comprising at least one processor among the one or more processors and configured to access one or more search criteria that correspond to a user;
a result module comprising at least one processor among the processors and configured to determine and provide a search result based on the accessed one or more search criteria, the search result being provided to the user and including an initial value that is subject to expiration;
a message module comprising at least one processor among the one or more processors and configured to:
generate a link that identifies the previously provided search result and refers to a location for an image yet to be generated; and
generate and provide a message that presents the previously provided search result with the generated link that identifies the previously provided search result and refers to the location for the image to be generated, the generated message being provided to a device of the user; and
an image module comprising at least one processor among the one or more processors and configured to:
access and store an updated value of the previously provided search result after expiration of the initial value of the previously provided search result; and
respond to operation of the link in the message by the device while opening the message by generating and providing the image to whose location the link refers, the generated and provided image depicting the updated value of the previously provided search result that is being presented by the message and is identified by the link, the image of the updated value being provided to the device and causing the device to present the image of the updated value after the expiration of the initial value and within the message that presents the previously provided search result with the link that identifies the previously provided search result and refers to the location for the image.

21. The system of claim 20, wherein:
the result module, in being configured to provide the search result, is configured to cause a presentation of the search result with the initial value in the search result; and
the image module, in being configured to provide the image of the updated value in the search result, is configured to cause the device of the user to display the image of the updated value with the previously provided search result.

* * * * *